UNITED STATES PATENT OFFICE.

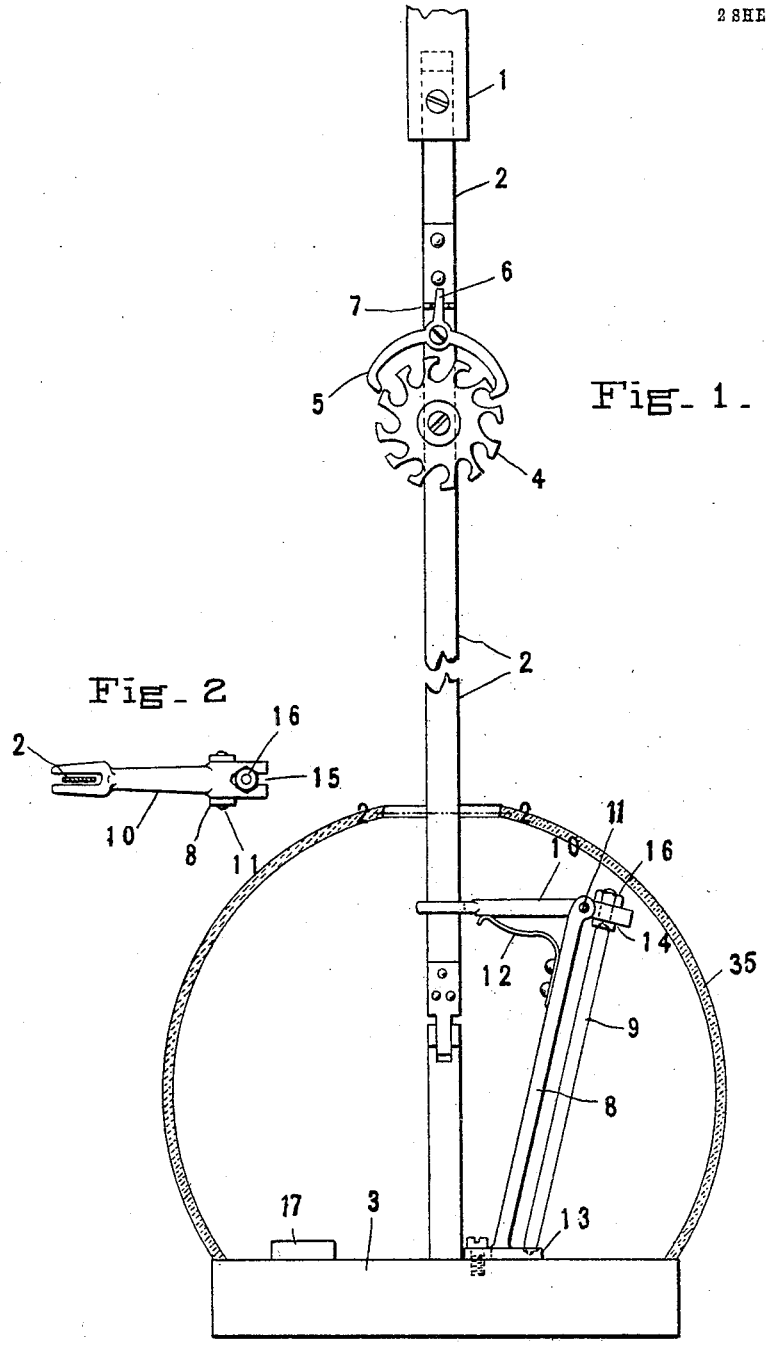

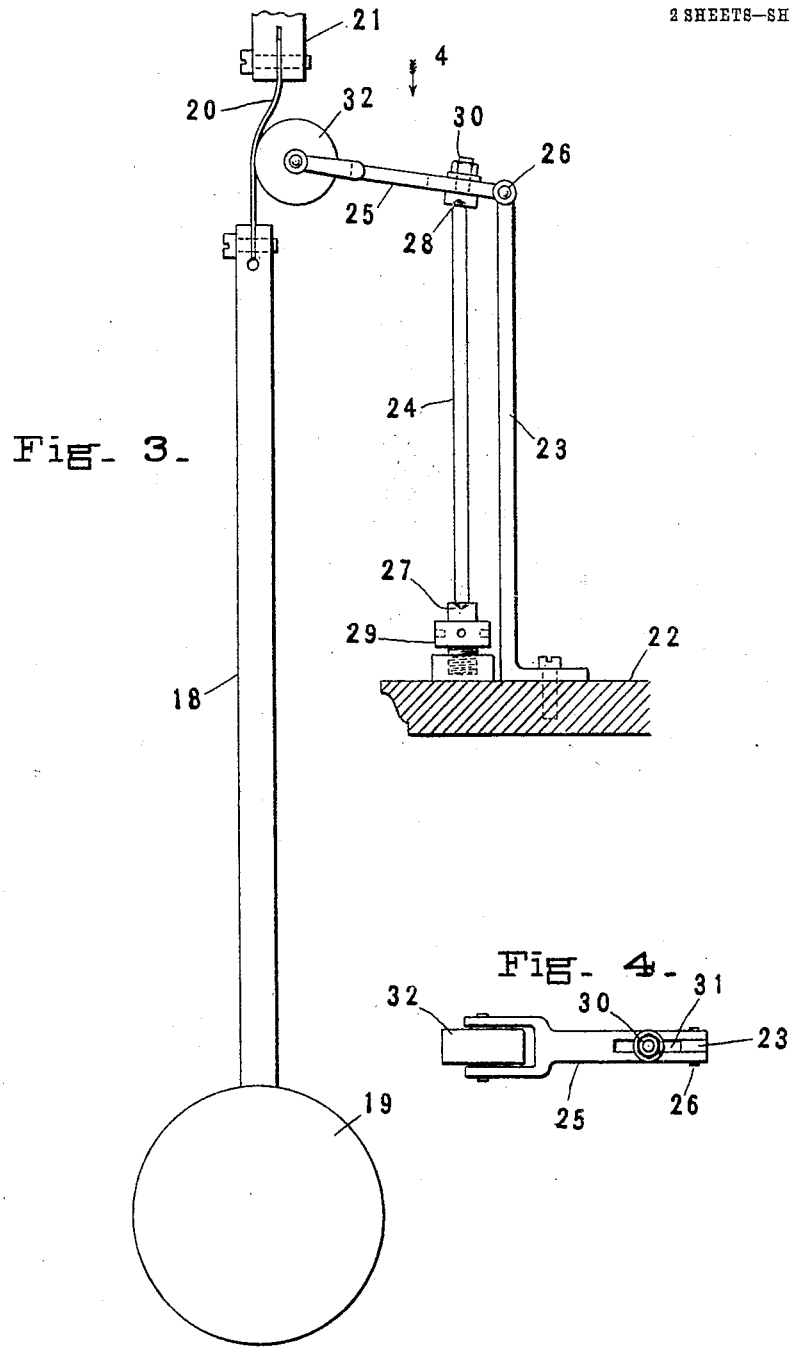

FREDERIC ECAUBERT, OF NEW YORK, N. Y.

COMPENSATING ESCAPEMENT-REGULATOR.

965,503.  Specification of Letters Patent.  Patented July 26, 1910.

Application filed November 4, 1907. Serial No. 400,500.

*To all whom it may concern:*

Be it known that I, FREDERIC ECAUBERT, a citizen of the United States of America, and a resident of borough of Brooklyn, county of Kings, city of New York, and State of New York, have invented certain new and useful Improvements in Compensating Escapement-Regulators, of which the following is a specification.

The present invention relates generally to compensating escapement regulators, and may be applied either to pendulums or balance wheels.

In balance wheels, and in pendulums of the type in which a weight is suspended on the end of a torsional spring, the chief cause of variations in the running of the timepiece results from a lengthening or shortening of the spring. Thus in a balance wheel measuring three-quarters of an inch in diameter, the effect of variations in size of the hair spring is equal to the expansion or contraction of a bar thirteen and one-half inches long. This has the effect of varying the length of oscillation of the regulator and the amount of compensation necessary to neutralize this is therefore relatively enormous. In ordinary pendulums the spring is relatively short and the full length of the pendulum can be utilized for the purpose of compensation, so that the problem there is not so formidable.

The present invention has for its object the provision of effective and reliable means for varying the length of the oscillation to compensate for temperature induced variations in size. This is effected by means of a lever or other member, pivotally connected to two members having unequal co-efficients of expansion, which serves to vary the effective length of the spring, or, in certain constructions of regulators, to change the center of oscillation in order to compensate for temperature induced variations.

Another feature resides in means, for varying the amount of compensation without varying the effective load and vice versa.

Other features of construction will appear as the specification proceeds.

In the accompanying drawings are shown concrete and preferred forms of the invention, but changes of construction may of course be made without departing from the legitimate and intended scope of the invention.

In the said drawings: Figure 1 is a general view showing the invention applied to an escapement regulator of the type in which a weight or balance wheel is suspended on the end of a torsional spring. Fig. 2 is a detail cross sectional view on the line 2—2 of Fig. 1. Fig. 3 is a general view showing the invention applied to an ordinary pendulum. Fig. 4 is a detail view looking in the direction of the arrow 4 of Fig. 3.

Similar characters of reference indicate corresponding parts in the different views.

Referring to Figs. 1 and 2, the numeral 1 indicates a stationary bracket on which is hung the torsional spring 2 carrying at its lower end the weight or balance wheel 3. 4 is the escapement wheel with which engage the pallets 5 to which is connected the end arm 6 of the verge. This pallet acts on the bifurcated arm 7 carried by the spring thereby imparting a torsional movement to the spring, 8 is an active member made of brass or phosphor bronze or other material having a relatively high co-efficient of expansion, and 9 is the passive member, consisting in this instance of a glass bar, having a relatively low coefficient of expansion. In the form here shown these members are mounted on the weight or balance wheel 3. Pivotally connected to these two members is the compensating lever or other member 10. This lever is connected to the active member by a pivot pin 11 or otherwise and is normally held in contact with the passive member by means of the spring 12. The said passive member rests in the countersinks 13 and 14. The free end of the lever 10 is here bifurcated so as to embrace the spring, and under the influence of the difference in expansion and contraction of the two members plays along the spring so as to vary its effective length to compensate for temperature induced variations in size. The end of the compensating lever adjacent to the passive member is provided with a slot 15 for the reception of the nut 16, which when adjusted varies the leverage or effective throw of the compensating lever. By this means the amount of compensation or compensating movement of the lever is varied. To balance the parts, an auxiliary weight 17 is mounted on the balance wheel. 35 indicates a cover of glass or other material to hide the compensating mechanism.

Referring to Figs. 3 and 4, the invention is here shown applied to a pendulum of the usual type. The pendulum rod 18 is provided with a bob or weight 19 and is supported by means of the spring 20 having the fixed support 21. Mounted on the stationary bracket 22 are the active and passive members 23 and 24, preferably of brass or glass as before. The compensating lever 25 is pivotally connected to the active member by means of the pivot pin 26, while the passive member is held in position in the countersinks 27 and 28, the weight of the compensating lever keeping the passive member in its bearings. The countersink 27 is formed in the socket member 29, which socket member when adjusted serves to vary the effective load of the regulator without varying the amount of compensation. The countersink 28 is formed on the nut 30 which is adjustable in the slot 31 whereby the leverage of the lever is adjusted or the amount of compensation varied without changing the effective load. The free end of the compensating lever is provided with an antifriction roll 32 which bears against the spring 20, and by its up and downward play serves to vary the effective length of the spring and to vary the center of oscillation to compensate for temperature induced variations in the size of the regulator. It will be noted that the roll 32 bears only on one side of the spring, but owing to the fact that the said spring rests partially on the said roll it will limit the oscillation in both directions since the spring never leaves the roll entirely. If desired, however, the fork shown in Figs. 1 and 2 could be employed to hold the spring on both sides.

What is claimed is:

1. The combination of an oscillating member connected with a stationary point of support, a weight secured to said oscillating member, a controlling member consisting of a pivoted lever, one end of which is movable along the oscillating member between the weight and the support and controlling the operative length of the oscillating member and thermostatic means for varying the position of said controlling member, said thermostatic means comprising a rigid metal rod expanding under the influence of heat in the direction of a straight line along the length of said rod, one end of said rod being rigidly attached to a support and the other member of said rod engaging with the controlling lever to operate the same and a rod of less expansible material than the first-named rod interposed between the stationary support for the first-named rod and the operating lever, the end of said second-named rod serving as the fulcrum for the lever.

2. The combination of an oscillating member connected with a stationary point of support, a weight secured to said oscillating member, a controlling member consisting of a pivoted lever, one end of which is movable along the oscillating member between the weight and the support and controlling the operative length of the oscillating member and thermostatic means for varying the position of said controlling member, said thermostatic means comprising a rigid metal rod expanding under the influence of heat in the direction of a straight line along the length of said rod, one end of said rod being rigidly attached to a support and the other member of said rod engaging with the controlling lever to operate the same and a rod of less expansible material than the first-named rod interposed between the stationary support for the first-named rod and the operating lever, the end of said second-named rod serving as the fulcrum for the lever, and means for maintaining said second-named rod under compression in the direction of its length during all positions of the operating lever.

3. The combination of an oscillating member connected with a stationary point of support, a weight secured to said oscillating member, a controlling member consisting of a pivoted lever, one end of which is movable along the oscillating member between the weight and the support and controlling the operative length of the oscillating member and thermostatic means for varying the position of said controlling member, said thermostatic means comprising a rigid metal rod expanding under the influence of heat in the direction of a straight line along the length of said rod, one end of said rod being rigidly attached to a support and the other member of said rod engaging with the controlling lever to operate the same and a rod of less expansible material than the first-named rod interposed between the stationary support for the first-named rod serving as the fulcrum for the lever and terminating in a bearing movable and adjustable along the length of the operating lever.

Signed at New York city this 29th day of October 1907.

FREDERIC ECAUBERT.

Witnesses:
GEO. A. MARSHALL,
AXEL V. BEEKEN.